United States Patent [19]
Van Belle

[11] Patent Number: 5,918,972
[45] Date of Patent: Jul. 6, 1999

[54] ROOF FIXTURE FOR VENTILATING AND ILLUMINATING A VEHICLE

[76] Inventor: Paul D. Van Belle, 1507 S. 13th Street, Niles, Mich. 49120

[21] Appl. No.: 08/880,261

[22] Filed: Jun. 23, 1997

[51] Int. Cl.[6] ............................... B60Q 3/02; F21V 31/02
[52] U.S. Cl. ........................ 362/480; 362/96; 362/149; 362/267; 362/490
[58] Field of Search ............................. 362/96, 149, 218, 362/267, 294, 479, 480, 490, 373, 404

[56] References Cited

U.S. PATENT DOCUMENTS

| | | | |
|---|---|---|---|
| 1,602,978 | 10/1926 | Horine | 362/480 |
| 1,706,694 | 3/1929 | Kimbel | 362/480 |
| 2,259,089 | 10/1941 | Sipp et al. | 362/480 |
| 3,101,038 | 8/1963 | Archer | 362/96 |
| 3,305,168 | 2/1967 | Ramniceanu | 362/480 |
| 4,449,166 | 5/1984 | Sharp | 362/149 |
| 5,664,872 | 9/1997 | Spearman et al. | 362/96 |

*Primary Examiner*—Alan Cariaso
*Attorney, Agent, or Firm*—Baker & Daniels

[57] ABSTRACT

A roof fixture for ventilating and illuminating the interior space of the vehicle or boat. The fixture includes a blower mounted over a ventilating opening in the roof. An outer cover is mounted to the exterior of the roof over the blower, thereby protecting the fixture and the interior of the vehicle from the elements. A mounting plate is attached to the interior of the roof over the ventilating opening. The central portion of the plate includes a plurality of exhaust openings and a recessed area which receives a lamp for illuminating the interior space. A plurality of damper flaps are attached to the exterior side of the plate, each flap overlying an exhaust opening. When the blower is on, the flaps lift upwardly to permit air flow from the interior space of the vehicle, through the exhaust openings, and out a vented portion of the cover.

16 Claims, 3 Drawing Sheets

ROOF FIXTURE FOR VENTILATING AND ILLUMINATING A VEHICLE

The present invention relates to a roof fixture for ventilating and illuminating the interior space of a vehicle.

BACKGROUND OF THE INVENTION

Vehicles having interior spaces for carrying passengers, such as recreational vehicles and boats, require both ventilation and lighting. Because such spaces are typically small, ventilating and lighting fixtures should be compact and encroach minimally into the occupied space. Additionally, since these vehicles move when occupied, it is desirable that ventilation fixtures prevent back drafts from entering the interior space and minimize the noise audible within the interior space.

Conventional devices for ventilating and/or illuminating the interior spaces of such vehicles often consist of separate exhaust vents and lighting fixtures which occupy an unnecessary amount of wall and ceiling space. Other conventional ventilation devices employ manually operable or automatic air flow shutters which generally fail to provide a tight seal and chatter or vibrate in response to the back drafts created as the vehicle moves.

SUMMARY OF THE INVENTION

The present invention provides a roof fixture for ventilating and illuminating an interior space of a vehicle such as a recreational vehicle or a boat. The fixture includes a blower mounted over a ventilating opening formed in the roof. The blower and opening are protected exteriorly by an outer cover with an open section for emitting air drawn from the interior space of the vehicle by the blower. A mounting plate is attached to the interior side of the roof over the ventilating opening and includes a central portion. A lamp for illuminating the interior space is mounted to the central portion of the mounting plate. A plurality of exhaust apertures in the mounting plate to route air through to the ventilating opening surround the lamp. A compliant gasket forms a circumferential seal around the ventilating opening between the mounting plate and the vehicle roof. A plurality of flexible damper flaps are connected across the gasket and extend along the mounting plate to overlie the exhaust apertures. The flaps seal the exhaust apertures when the blower is off, thereby preventing external air from flowing into the interior of the vehicle. When the blower is on, the force of the upwardly drawn air raises the flaps from the mounting plate, thereby permitting air to be drawn from the interior space of the vehicle.

Accordingly, it is an object of the present invention to provide a roof fixture for a vehicle which combines the functions of ventilating and illuminating the interior space of the vehicle.

Another object of the present invention is to provide a roof fixture for ventilating and illuminating a vehicle which operates quietly and prevents drafts from entering the interior space of the vehicle.

BRIEF DESCRIPTION OF THE DRAWINGS

The above-mentioned and other objects and advantages of this invention, and the manner of attaining them, will become more apparent and the invention will be better understood by reference to the following description of embodiments of the invention taken in conjunction with the accompanying drawings, wherein.

Figure 1:
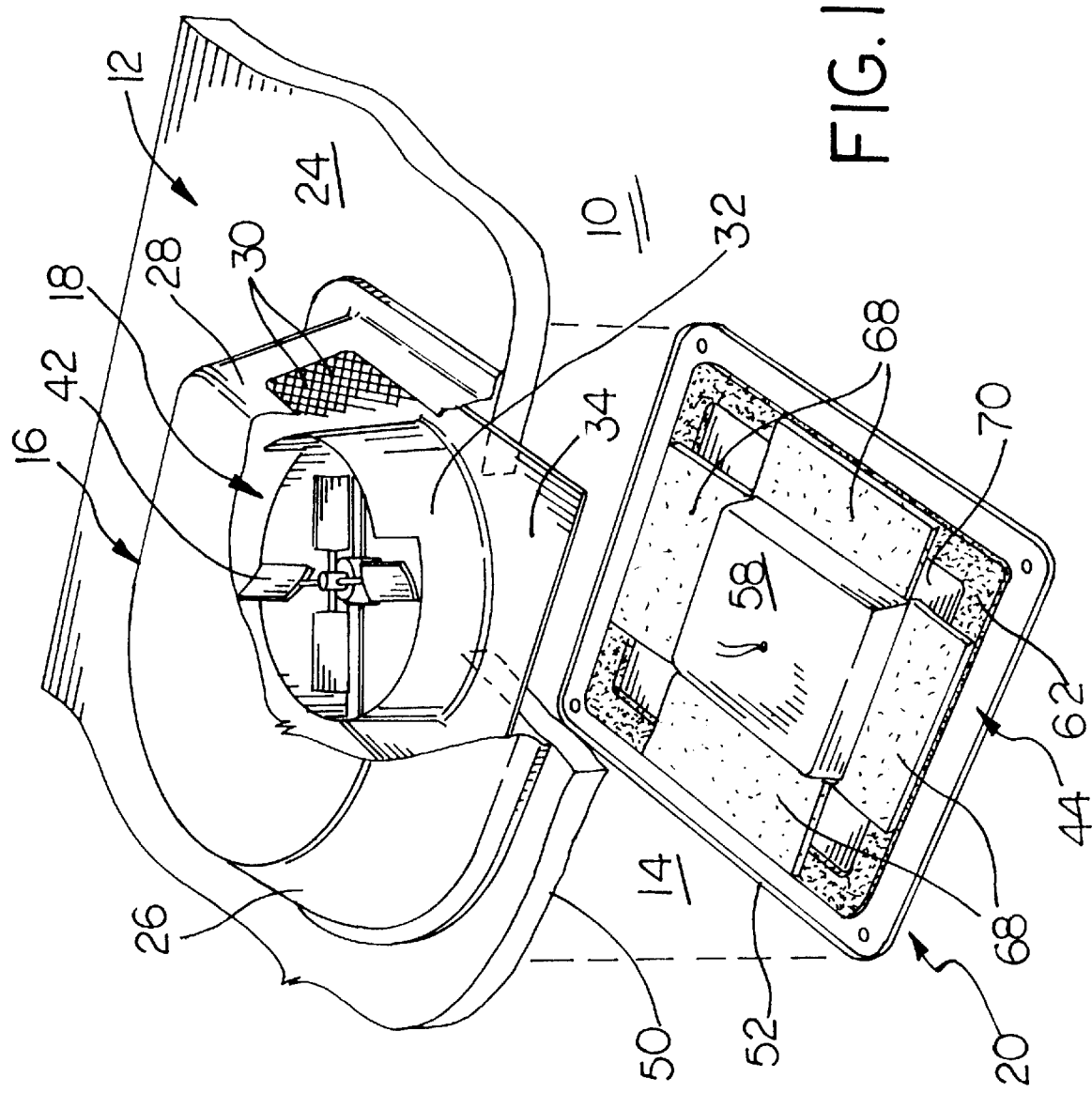
FIG. 1 is a partially fragmented, exploded perspective view of the roof fixture of the present invention shown mounted to the roof of a vehicle.

Corresponding reference characters indicate corresponding parts throughout the several views. Although the drawings represent an embodiment of the present invention, the drawings are not necessarily to scale and certain features may be exaggerated in order to better illustrate and explain the present invention.

DESCRIPTION OF THE INVENTION

The embodiments disclosed in the detailed description below are not intended to be exhaustive or to limit the invention to the precise forms disclosed. Rather, the embodiments selected for the description are disclosed so that others skilled in the art may utilize their teachings.

FIG. 1 shows a roof fixture 10 according to the present invention mounted to the ceiling or roof 12 of a vehicle, such as a recreational vehicle or a boat, having a room or an interior space 14. The fixture includes an outer cover 16, a blower generally designated 18, and a mounting plate generally designated 20 carrying a lamp 22. Cover 16 is mounted to the exterior surface 24 of roof 12 in a standard manner such as by screws (not shown) to protect blower 18 and interior space 14 from the elements. Cover 16 includes a front leading side 26 which is inclined for reduced wind resistance, and a rear trailing side 28 which in part is of mesh form to provide apertures 30 to allow air to be exhausted from interior space 14.

Blower 18 includes a substantially cylindrical shroud 32 connected to a peripheral attachment flange 34. Attachment flange 34 is screwed or otherwise attached to roof exterior surface 24 so that shroud 32 is substantially centered over a ventilation opening 36 formed through roof 12. Spaced supports 38 extend from the inner surface 40 of shroud to the fan motor to position the blower fan 42 within the shroud. Fan 42 is electrically connected to the power system of the vehicle and is operated by an external switch (not shown) which may be mounted, for example, on a wall of interior space 14 or on mounting plate 20.

Figure 2:
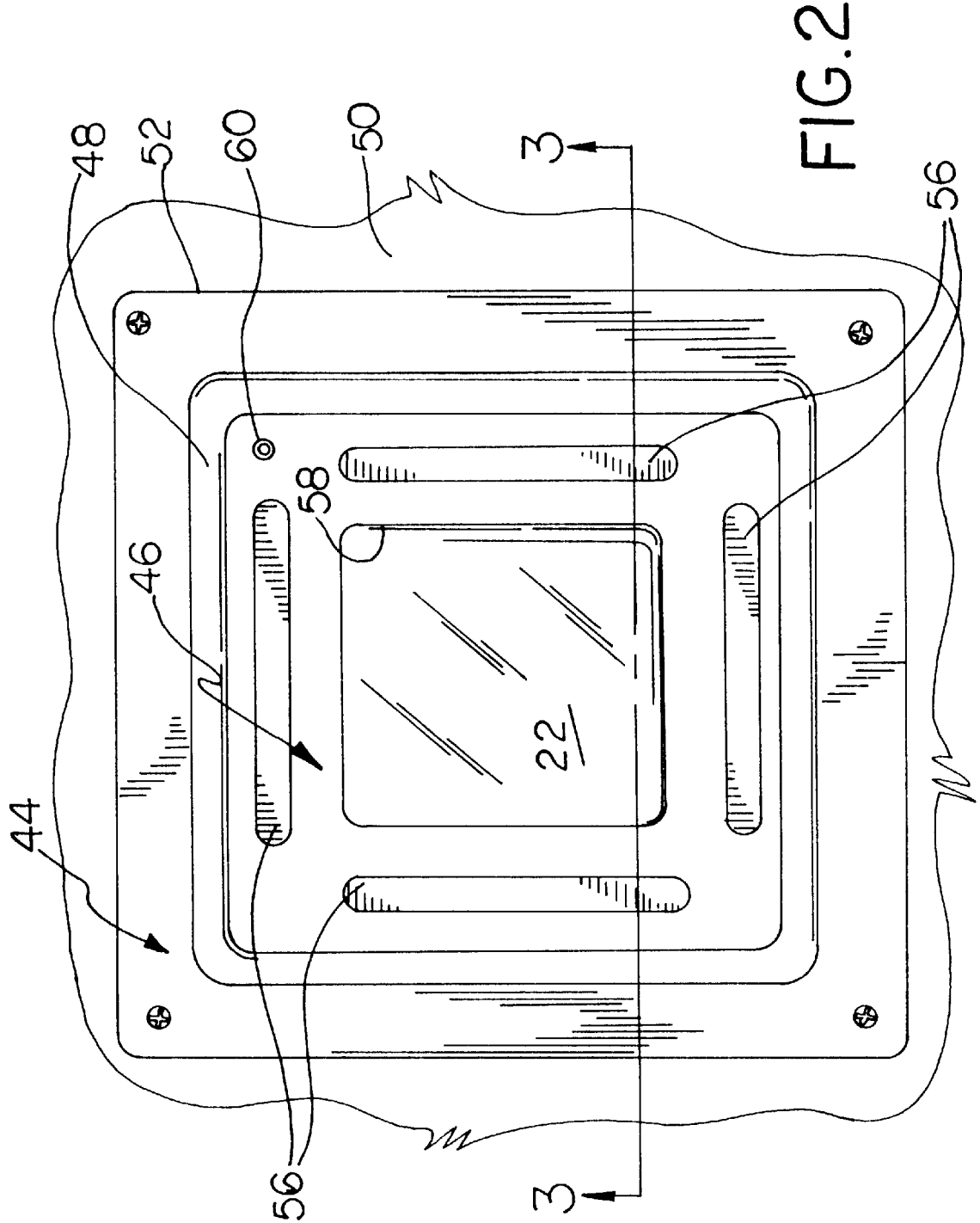
FIG. 2 is a bottom plan view of the roof fixture of FIG. 1 as seen from the interior of the vehicle.
Figure 3:
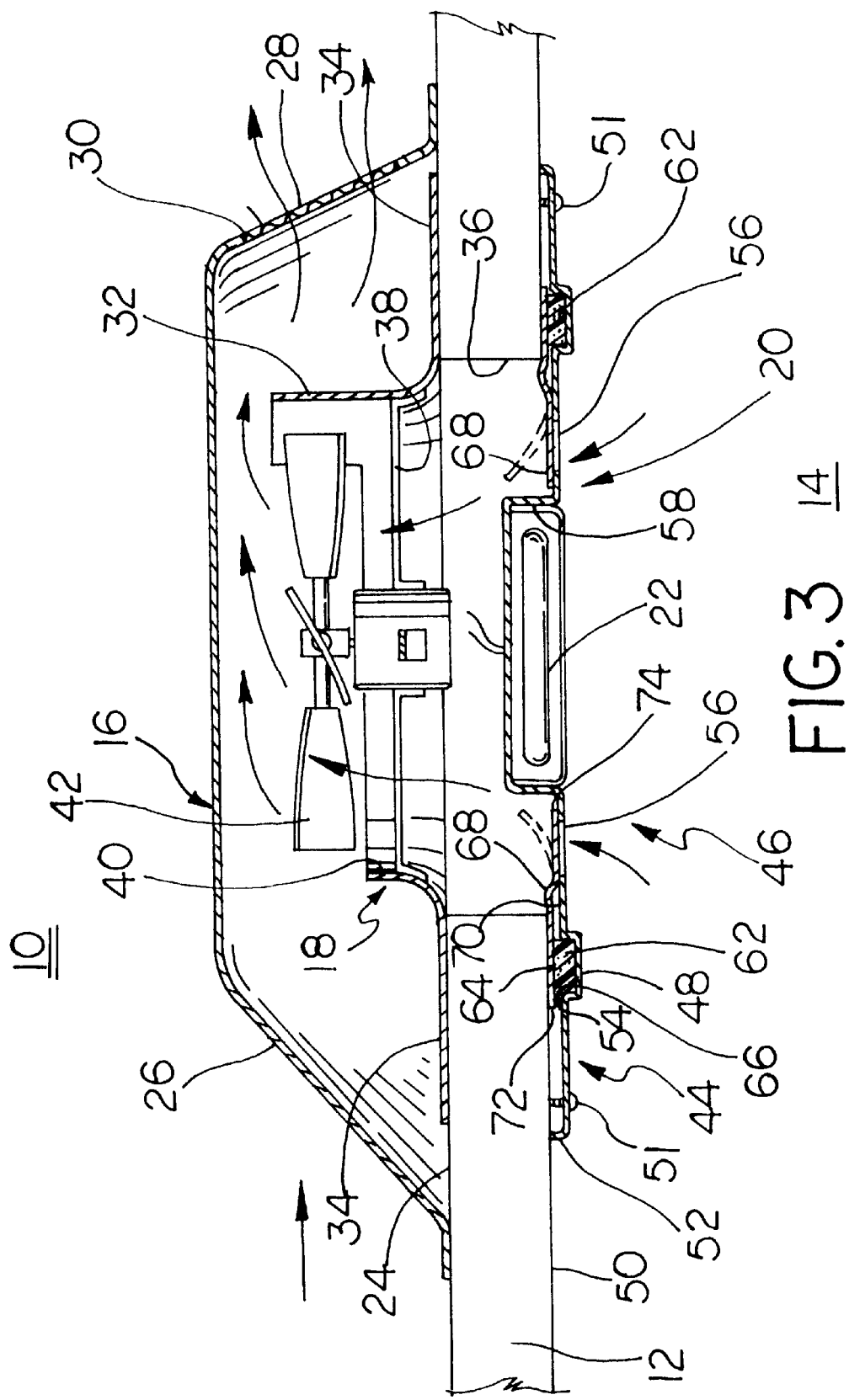
FIG. 3 is a cross-sectional view taken substantially along line 3—3 of FIG. 2.

As best seen in FIGS. 2 and 3, mounting plate 20 includes a marginal portion 44 and a central portion 46 separated by a continuous outwardly projecting ridge 48. Plate 20 at marginal portion 44 is attached to the interior surface 50 of roof 12 over ventilation opening 36 using conventional fasteners 51. Marginal portion 44 includes an outer peripheral inturned flange 52. Ridge 48 forms a continuous inner channel 54 which extends about ventilation opening 36 when plate 20 is attached to roof 12. Central portion 46 of plate 20 includes a plurality of exhaust apertures 56 which, in an exemplary embodiment, are elongated slots spaced uniformly around central portion 46 adjacent channel 54 along each of the four sides of plate 20. Central portion 46 also includes a recessed area 58 which projects partially upwardly into ventilation opening 36. Recessed area 58 is shown centered between exhaust apertures 56 in FIGS. 2 and 3. A housing lamp 22 for illuminating interior space 14 of the vehicle or boat is mounted within recessed area 58. In this manner, a substantial portion of lamp 22 is recessed within ventilation opening 36, thereby preserving head room within interior space 14 of the vehicle. Lamp 22 is electrically connected to and operated by switch 60 which is connected to the vehicle power source.

A compliant gasket 62 fits within channel 54. Gasket 62 carries an adhesive on its surface 66 so as to be retained within the channel. A plurality of flexible damper flaps 68, formed of rubber or a similar suitable flexible material, are each attached to an adhesive surface 64 of gasket 62. Each flap 68 extends along the exterior surface 70 of plate central portion 46 over an adjacent exhaust aperture 56. As best seen in FIG. 3, each flap 68 includes a captive edge portion 72, which is compressed between gasket 62 and interior surface 50 of roof 12, and a free edge portion 74, which extends toward recessed area 58. Captive edge portion 72 of each flap 68 cooperates with gasket 62 to form a seal between mounting plate 20 and roof 12 about the periphery of ventilation opening 36. Exhaust apertures 56 are inset from channel 54 so that when flaps 68 are closed (as shown in solid lines in FIG. 3), the flaps lay flat against exterior surface 70 of plate central portion 46 around the periphery of exhaust apertures 56. Further, apertures 46 inset from the periphery of ventilation opening 36 in roof 12 to allow for the ease of opening movement of flaps 68.

MODE OF OPERATION

In operation, lamp 22 is activated by depressing switch 60. Blower 18 is operable independently using an external switch usually mounted to a room side wall. When blower 18 is activated, fan 42 rotates, thereby drawing air from space 14 through shroud 32 and out apertures 30 in trailing edge 28 of cover 16. This air flow draws flaps 68 upwardly, away from exterior surface 70 of plate central portion 46 (as shown in broken lines in FIG. 3). Upon moving to this opened position, flaps 68 permit air flow upwardly from interior space 14 of the vehicle through exhaust apertures 56, ventilation opening 36, and out cover 16.

When fan 42 is deactivated, flaps 68 drop to their closed position (as shown in solid lines in FIG. 3). Flaps 68 thus prevent any back draft (i.e., any air flow in a direction opposite to the arrows shown in FIG. 3) from entering interior space 14 of the vehicle. Any back draft within space 14 simply ensures that flaps 68 are forced into sealing engagement with exterior surface 70. Furthermore, gasket 62, which circumscribes ventilation opening 36, prevents air from entering interior space 14 between roof 12 and marginal portion 44 of mounting plate 20.

While this invention has been described as having exemplary embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fixture for use in an interior living space with a ceiling having a ventilating opening and an overlying exhaust blower, said fixture comprising:
    a mounting plate having an upper and lower surface and including
        a marginal portion adapted for attachment to the interior side of said ceiling about said ventilating opening and,
        a central portion for extending across said ventilating opening, a lamp mounted to said lower surface of said plate central portion for illuminating said interior space,
        said plate central portion having an exhaust aperture in communication with said interior space and ventilating opening;
    said exhaust aperture being disposed between said lamp and said marginal portion of said mounting plate for location under said ventilation opening; and
    a damper flap carried by said mounting plate at its said upper surface and extending freely over said exhaust aperture,
        said flap being movable between a closed position sealingly overlaying said exhaust aperture when said blower is off and an opened position spaced from said exhaust aperture when said blower is on.

2. A fixture as claimed in claim 1 further comprising a compliant gasket carried by said plate upper surface around said central portion for positioning between said plate marginal portion and said ceiling to form a circumferential seal around said ventilating opening.

3. A fixture as claimed in claim 2 wherein said damper flap is carried over said gasket for compression between said gasket and ceiling when said panel outer portion is attached to the ceiling.

4. A fixture as claimed in claim 2 wherein said mounting plate includes a continuous channel part receiving said gasket.

5. A fixture as claimed in claim 4 wherein said channel part is spaced from said exhaust aperture, said damper flap being attached to said gasket.

6. A fixture as claimed in claim 1 wherein said plate outer portion includes a flanged peripheral edge.

7. A fixture as claimed in claim 1 wherein said exhaust aperture is an elongated slot.

8. A fixture as claimed in claim 3 wherein said plate central portion includes more than one said exhaust aperture spaced about said lamp, a said damper flap for each exhaust aperture.

9. A fixture as claimed in claim 1 wherein said plate central portion defines a recessed area for receiving said lamp, said recessed area extending partially into the ventilating opening when said plate marginal portion of said mounting plate is attached to said ceiling.

10. In combination, on a vehicle having an interior space bounded in part by a ceiling having a ventilating opening therethrough, an exhaust-light apparatus comprising:
    a mounting plate mounted to said ceiling within said interior space across said ventilating opening, said mounting plate including
        a marginal portion and
        a central portion having an exhaust aperture underlying said ventilating opening,
    a blower carried by said ceiling exteriorly of said interior space for drawing air from the interior space through said exhaust aperture;
    a lamp mounted to said plate central portion for illuminating the interior space;
    a movable flap for controlling the direction of air flow through said exhaust aperture, said flap carried by said mounting plate and located between the mounting plate and ceiling, said flap overlying said exhaust aperture and being movable between a closed position when said blower is off wherein said flap seals said exhaust aperture and an opened position when said blower is on wherein said flap is spaced away from said exhaust aperture.

11. The apparatus as claimed in claim 10 further comprising a compliant gasket compressively disposed between said mounting plate and said ceiling about said ventilating opening.

12. The apparatus as claimed in claim 11 wherein said mounting plate includes a channel part circumscribing said ventilating opening, said exhaust aperture being disposed between said channel part and said lamp, said gasket seated within said channel part.

13. The apparatus as claimed in claim 11 wherein said flap is compressed between said gasket and said ceiling.

14. The apparatus as claimed in claim 11 wherein said plate central portion includes more than one said exhaust aperture spaced about said lamp, a said flap extending over each said exhaust aperture.

15. The apparatus as claimed in claim 14 wherein said plate central portion defines a recessed area extending partially into the ventilating opening, said lamp mounted within said recessed area.

16. The apparatus as claimed in claim 14 including a cover overlying said blower, said cover being vented.

\* \* \* \* \*